(12) United States Patent
Tomono (10) Patent No.: US 9,749,503 B2
(45) Date of Patent: Aug. 29, 2017

(54) IMAGE PROCESSING DEVICE, IMAGE PROCESSING METHOD AND RECORDING MEDIUM

(71) Applicant: FUJIFILM CORPORATION, Tokyo (JP)

(72) Inventor: Masafumi Tomono, Yokohama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/184,427

(22) Filed: Jun. 16, 2016

(65) Prior Publication Data

US 2017/0026552 A1   Jan. 26, 2017

(30) Foreign Application Priority Data

Jul. 24, 2015   (JP) ................... 2015-146364

(51) Int. Cl.
| | |
|---|---|
| *G06K 9/00* | (2006.01) |
| *H04N 1/62* | (2006.01) |
| *G06T 7/90* | (2017.01) |
| *G06K 9/46* | (2006.01) |
| *G06K 9/68* | (2006.01) |
| *H04N 1/60* | (2006.01) |

(52) U.S. Cl.
CPC ......... *H04N 1/628* (2013.01); *G06K 9/00221* (2013.01); *G06K 9/00295* (2013.01); *G06K 9/00677* (2013.01); *G06K 9/4652* (2013.01); *G06K 9/6814* (2013.01); *G06T 7/90* (2017.01); *H04N 1/6077* (2013.01); *H04N 1/6097* (2013.01)

(58) Field of Classification Search
CPC .... H04N 1/628; H04N 1/6077; H04N 1/6097; G06K 9/00221; G06K 9/00295; G06K 9/00677; G06K 9/4652; G06K 9/6814; G06T 7/90
See application file for complete search history.

(56) References Cited

U.S. PATENT DOCUMENTS

| | | | |
|---|---|---|---|
| 8,433,134 B2 * | 4/2013 | Ishii .................. | G06T 11/001 |
| | | | 348/222.1 |
| 2005/0207644 A1 * | 9/2005 | Kitagawara ......... | G06T 11/60 |
| | | | 382/167 |

(Continued)

FOREIGN PATENT DOCUMENTS

| | | |
|---|---|---|
| JP | 2008244995 A | 10/2008 |
| JP | 2008244996 A | 10/2008 |

*Primary Examiner* — Gregory M Desire
(74) *Attorney, Agent, or Firm* — Studebaker & Brackett PC (57) ABSTRACT

In the image processing device, the image processing method and the recording medium, the image extractor extracts, from the captured images, captured images regarded as being captured in the same time range, as extracted images. The target image determiner selects an extracted image which were captured by a capturing person who captured largest number of extracted images and with a capturing device of a type used to capture largest number of extracted images, as a target image. The object image determiner selects an extracted image showing a subject similar to a subject present in the target image, as an object image. The color table generator generates a color table for matching colors of the object image to colors of the target image. The color conversion processor carries out the color conversion applying the color table to the object image.

20 Claims, 4 Drawing Sheets

(56) References Cited

U.S. PATENT DOCUMENTS

| | | | | |
|---|---|---|---|---|
| 2008/0127253 A1* | 5/2008 | Zhang | ................ | H04N 21/478 |
| | | | | 725/35 |
| 2016/0217336 A1* | 7/2016 | Su | ................ | G06K 9/00818 |
| 2017/0026552 A1* | 1/2017 | Tomono | ................ | H04N 1/628 |

\* cited by examiner

IMAGE PROCESSING DEVICE, IMAGE PROCESSING METHOD AND RECORDING MEDIUM

CROSS-REFERENCE TO RELATED APPLICATIONS

The present application claims priority under 119 to Japanese Patent Application No. 2015-145364, filed on Jul. 24, 2015. The above application is hereby expressly incorporated by reference, in its entirety, into the present application.

BACKGROUND OF THE INVENTION

The present invention relates to an image processing device, an image processing method and a recording medium for reducing the difference in color between a plurality of images captured with capturing devices of different types.

Nowadays, it is possible to easily order composite images that are created using a plurality of images, such as photo books and shuffle prints, at homes or stores. Occasionally, plural users bring their own images to create a composite image.

In most cases, however, users own capturing devices of different types such as digital cameras and smartphones, and therefore images captured by the users with their capturing devices are prone to differ in color and resolution. Accordingly, when created using images owned by plural users, a composite image may lack unity in color and resolution as a whole.

JP 2008-244995 A relates to an image processing system capable of reducing a color difference between pieces of digital image data acquired by devices of different types. The literature describes setting a target type and an object type of devices, selecting a color table used to make colors of image data acquired by a device of the object type close to colors of image data acquired by a device of the target type, and converting colors of image data input by the device of the object type based on the selected color table.

JP 2008-244996 A relates to an image processing system capable of reducing a color difference between face regions of a single subject person in pieces of image data acquired by devices of different types. The literature describes selecting and setting a target image and an object image from among a plurality of pieces of image data, detecting face regions of a single subject who is included in the target and object images, and carrying out color correction to make colors of a face region in the object image close to colors of a face region in the target image.

SUMMARY OF THE INVENTION

When performing color conversion, the image processing system of JP 2008-244995 A focuses attention on types of capturing devices that captured images. However, when captured in different time ranges, images may differ in color due to the difference in capturing location or capturing environment (natural conditions) even if they are captured with devices of the same type. Images showing different contents may also differ in color depending on the content even if they are captured with a device of the same type.

When performing color conversion, the image processing system of JP 2008-244996 A focuses attention on a face region of a subject person in images. However, when captured in different time ranges, images may differ in color due to the difference in capturing location or capturing environment even if they show the same subject person. Images showing different contents may also differ in color depending on the content even if they show the same subject person.

The image processing systems of JP 2008-244995 A and JP 2008-244996 A are configured to match even colors of images which do not need color matching, and the color conversion processing by the systems requires the great amount of calculation despite that the processing may not bring about the unity in color. This is a problem.

An object of the present invention is to solve the problem of the prior art and to provide an image processing device, an image processing method and a recording medium capable of reducing the difference in color between a plurality of images captured with capturing devices of different types, by taking account of the capturing location, the capturing environment and the capturing content.

In order to attain the object described above, the present invention provides an image processing device including:

an image acquiring section configured to acquire a plurality of captured images captured by one or more capturing persons with two or more capturing devices of different types;

a capturing information acquiring section configured to acquire, as capturing information, information on a capturing person, a type of capturing device and a capturing time for each of the captured images;

an image extractor configured to extract, from the captured images, captured images regarded as being captured in a same time range based on the information on a capturing time, as extracted images;

a target image determiner configured to sort out the extracted images on a capturing person basis and a capturing device type basis based on the information on a capturing person and a type of capturing device, select one of extracted images which were captured by a capturing person who captured largest number of extracted images and were captured with a capturing device of a type used to capture largest number of extracted images based on a result of the sorting out and determine the one of the extracted images selected, as a target image for color conversion;

an image analyzer configured to carry out image analysis on the extracted images;

an object image determiner configured to select, from among the extracted images other than the target image, one or more similar images that are extracted images each showing a subject similar to a subject present in the target image based on a result of the image analysis and determine the one or more similar images selected, as one or more object images to be subjected to the color conversion;

a color table generator configured to generate a color table used in the color conversion for matching colors of the one or more object images to colors of the target image based on the result of the image analysis; and a color conversion processor configured to carry out the color conversion by applying the color table to the one or more object images.

Also, the present invention provides an image processing method including:

a step of acquiring a plurality of captured images captured by one or more capturing persons with two or more capturing devices of different types, with an image acquiring section;

a step of acquiring, as capturing information, information on a capturing person, a type of capturing device and a capturing time for each of the captured images, with a capturing information acquiring section;

a step of extracting, from the captured images, captured images regarded as being captured in a same time range based on the information on a capturing time, as extracted images, with an image extractor;

a step of sorting out the extracted images on a capturing person basis and a capturing device type basis based on the information on a capturing person and a type of capturing device, selecting one of extracted images which were captured by a capturing person who captured largest number of extracted images and were captured with a capturing device of a type used to capture largest number of extracted images based on a result of the sorting out and determining the one of the extracted images selected, as a target image for color conversion, with a target image determiner;

a step of carrying out image analysis on the extracted images, with an image analyzer;

a step of selecting, from among the extracted images other than the target image, one or more similar images that are extracted images each showing a subject similar to a subject present in the target image based on a result of the image analysis and determining the one or more similar images selected, as one or more object images to be subjected to the color conversion, with an object image determiner;

a step of generating a color table used in the color conversion for matching colors of the one or more object images to colors of the target image based on the result of the image analysis, with a color table generator; and a step of carrying out the color conversion by applying the color table to the one or more object images, with a color conversion processor.

Also, the present invention provides a non-transitory computer readable recording medium having recorded thereon a program for causing a computer to execute each step of the image processing method according to above.

The present invention extracts images regarded as being captured in the same time range, as extracted images, and therefore can suitably limit capturing locations and capturing environments to be subjected to color difference reduction. The present invention also determines an extracted image showing a similar subject as an object image to be subjected to color conversion, and therefore can suitably limit capturing contents to be subjected to color difference reduction. As a consequence, the color conversion for bringing about the unity in color can be rapidly carried out on a plurality of images captured with capturing devices of different types.

DETAILED DESCRIPTION OF THE INVENTION

An image processing device, an image processing method and a recording medium of the present invention are described below in detail with reference to preferred embodiments shown in the accompanying drawings.

Figure 1:
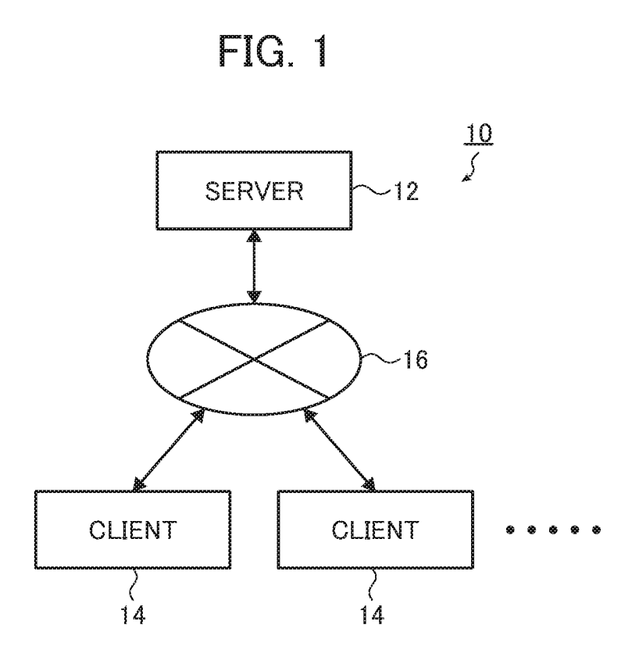
FIG. 1 is a block diagram showing an embodiment of the configuration of an image processing system of the invention.

FIG. 1 is a block diagram showing an embodiment of the configuration of an image processing system of the invention. An image processing system 10 shown in FIG. 1 reduces the difference in color and resolution between a plurality of images captured with two or more capturing devices of different types. The image processing system 10 includes a server 12 and two or more clients 14 connected to the server 12 via a network 16 such as the Internet.

Figure 2:
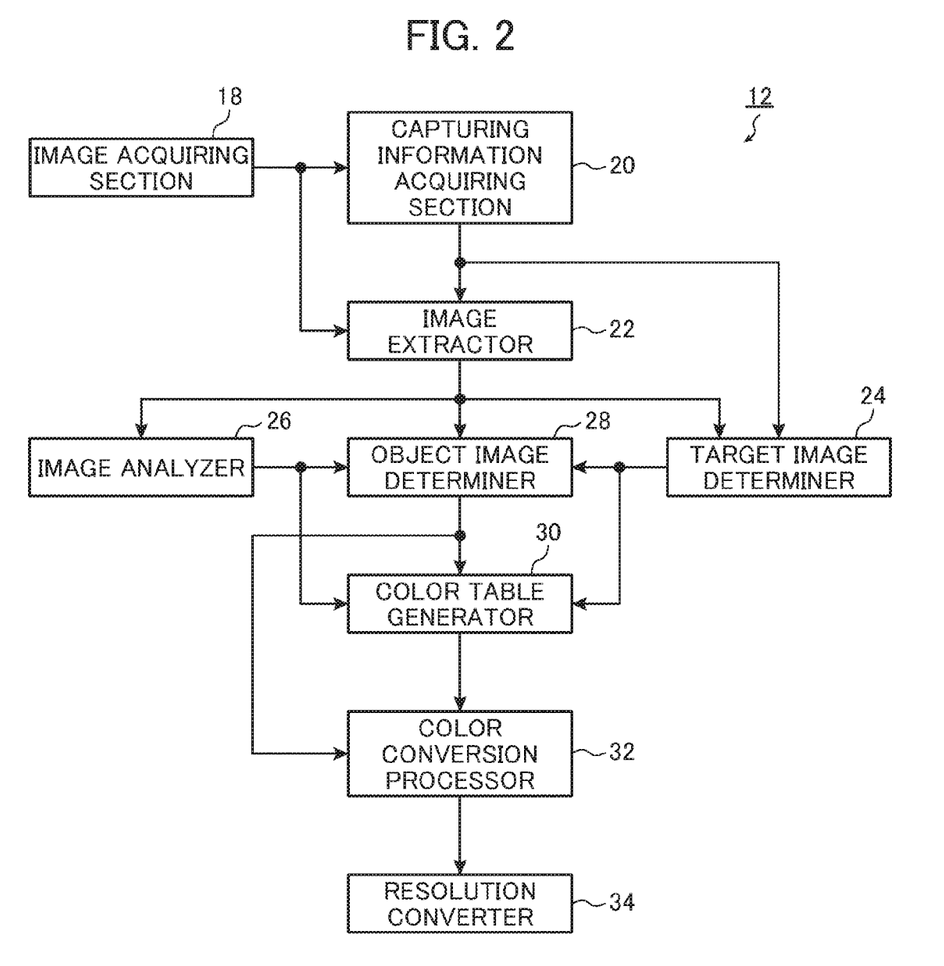
FIG. 2 is a block diagram showing an embodiment of the configuration of a server shown in FIG. 1.

FIG. 2 is a block diagram showing an embodiment of the configuration of the server shown in FIG. 1. The server 12 is one example of the image processing device of the invention. As shown in FIG. 2, the server 12 includes an image acquiring section 18, a capturing information acquiring section 20, an image extractor 22, a target image determiner 24, an image analyzer 26, an object image determiner 28, a color table generator 30, a color conversion processor 32 and a resolution converter 34.

In the server 12, the image acquiring section 18 acquires a plurality of images captured by one or more capturing persons with two or more capturing devices of different types.

The captured images may be images captured by a single capturing person with two or more capturing devices of different types, for instance, a digital camera and a smartphone, or images captured by two or more capturing persons with capturing devices of different types.

The capturing information acquiring section 20 acquires, as capturing information, information on a capturing person, a type of capturing device and a capturing time for each captured image acquired by the image acquiring section 18.

The information on a capturing person may be acquired from, for example, information on a user identification (ID) the user inputs when logging in the image processing system 10. The information on a capturing person does not necessarily need to be useful in identifying a person who captured the relevant image, and it is only essential to distinguish between capturing persons. The information on a type of capturing device and that on a capturing time may be acquired from, for instance, exchangeable image file format (EXIF) information associated with each captured image.

The image extractor 22 extracts, from captured images, images regarded as being captured in the same time range based on the information on a capturing time acquired by the capturing information acquiring section 20, as extracted images.

The images regarded as being captured in the same time range are, for instance, a group of images that were captured in the same time range with two or more capturing devices of different types and that show at least one of the same subject (a person or an object other than a person) and the same place. The term "same time range" refers to a single time range during which images were captured with two or more capturing devices of different types. The same time range may be a certain period of time set in advance or a period of time with a given length.

Examples of such images regarded as being captured in the same time range include: in cases where captured images are arranged in chronological order, a group of chronologically-arranged images that were captured in a certain period of time set in advance, e.g., five or ten minutes, and a group of chronologically-arranged images in which chronologically-adjacent images were captured at a time interval shorter than a threshold, e.g., one minute; a group of images that are determined to have been captured in the same event, such as a wedding, a birthday party or a sports day, based on a result of image analysis by the image analyzer 26 to be described later; and a group of captured images included in the same double page layout in a photo book or an electronic photograph album.

The target image determiner 24 sorts out extracted images on a capturing person basis and a capturing device type basis based on the information on a capturing person and that on a type of capturing device acquired by the capturing information acquiring section 20, selects one of the extracted images which were captured by the capturing person who captured the largest number of extracted images and were captured with a capturing device of the type used to capture the largest number of extracted images based on a result of the sort-out, and determines the selected extracted image as a target image for color conversion to be carried out by the color conversion processor 32, which will be described later.

The target image is an image having colors that serve as the target (standard) when an object image is subjected to color conversion, which will be described later.

The target image determiner 24 can select, as the one extracted image, any of extracted images which were captured by the capturing person who captured the largest number of extracted images and were captured with a capturing device of the type used to capture the largest number of extracted images. Alternatively, based on, for example, a result of image analysis, the target image determiner 24 may select an extracted image whose evaluation value for rightness, out-of-focus blur, motion blur, color, resolution and the like is not less than a threshold and determine the selected extracted image as a target image.

The image analyzer 26 carries out image analysis on each extracted image.

For instance, the image analyzer 26 carries out, inter alia, face detection processing for detecting the face region of a person in an extracted image, an object recognition processing for recognizing an object other than a person (e.g., pets, dishes, flowers, trains and cars) in an extracted image, a scene recognition processing for recognizing a scene (e.g., night views, evening views, ocean views, and landscapes of nature (trees)) in an extracted image, a similar image determination processing for determining as to whether there is a similar image that is an extracted image showing a similar subject, and an event classification processing for classifying (grouping) a plurality of images on a basis of an event (such as a birthday party or a sports day) by reference to information associated with the images, such as capturing times and capturing locations.

In addition, the image analyzer 26 can calculate an evaluation value mentioned above based on at least one of brightness, out-of-focus blur, motion blur, color and resolution. An extracted image having an evaluation value not less than a threshold is an image that meets certain standards in terms of brightness, out-of-focus blur, motion blur, color and resolution.

The object image determiner 28 selects, from among extracted images other than a target image determined by the target image determiner 24, a similar image that is an extracted image showing a subject similar to a subject present in the target image based on a result of the image analysis, and determines the selected similar image as an object image to be subjected to color conversion.

The object image is an image to be subjected to color conversion that is carried out to match colors of an object image to colors of the target image.

The object image determiner 28 may determine all similar images as object images; however, when there are too many object images and this results in the increase in processing time, the object image determiner 28 may determine, among all similar images, for example, only similar images captured with capturing devices of types different from the type of a device used to capture the target image, only similar images having evaluation values less than a threshold, or only similar images captured with capturing devices of types different from the type of a device used to capture the target image as well as having evaluation values less than a threshold, as object images.

The object image determiner 28 may use the color correction that a capturing person applied for a captured image in past, select, from among all similar images, a similar image that needs this color correction, and determine the selected similar image as an object image. For instance, when a capturing person applied color correction for increasing a red saturation level of a captured image in past, a similar image captured with a capturing device of the type which tends to generate images with strong red cast is not selected as an object image, that is, a similar image captured with a capturing device of the type which tends to generate images with less red cast is selected as an object image.

The color table generator 30 generates a color table used in color conversion for matching colors of an object image determined by the object image determiner 28 to colors of a target image determined by the target image determiner 24, based on a result of image analysis.

The color table generator 30 may generate a color table with a known method. For instance, when each pixel in an image is represented by 8-bit RGB (red, green and blue) image data values ranging from 0 to 255, the color table generator 30 may make RGB histograms of image data of target and object image and generate a color table for use in color conversion so as to match histograms of image data of the object image to histograms of image data of the target image.

The color table generator 30 may generate a color table using entire regions of target and object images; however, when the relevant region is too large and this results in the increase in processing time, the color table generator 30 may generate a color table using one or more segments of regions of target and object images.

For example, the color table generator 30 may generate a color table using the face region of a person present in target and object images based on a result of face detection processing. Alternatively, the color table generator 30 may generate a color table using the region of an object present in target and object images based on a result of object recognition processing, for instance, in cases where strawberries are present in target and object images, using the region of the strawberries.

When two or more capturing persons co-create a composite image such as a photo book, it is assumed that images regarded as being captured by two or more capturing persons in the same time range are images captured basically at the same place. Under the assumption, the color table generator 30 may generate a color table using the region of background present in target and object images based on a result of scene recognition processing, for example, in cases where target and object images show the sky, using the sky region.

The color table generator 30 may use color correction that a capturing person applied for a captured image in past and generate a color table including the color correction. For instance, when a capturing person applied the color correction for increasing a red saturation level of a captured image in past, the color table generator 30 generates a color table so that the color table includes this color correction and serves to increase a red saturation level while matching colors of an object image to colors of a target image.

The color table generator 30 may generate a color table used in color conversion for matching colors of an object image to colors of a target image only in terms of hue and chroma (chromaticity) without changing lightness.

For instance, when persons playing beach volleyball are captured by two or more persons from different directions, images are captured under the sun, and the brightness of sea and sky do not greatly vary. Therefore, the lightness should be matched as well in color matching. On the other hand, when, for example, strawberries are captured by two or more persons from different directions in a room, it is desired to match colors of the strawberries but not necessary to match the lightness because the brightness varies depending on the direction from which an image is captured.

In this case, the color table generator 30 can generate a color table used in, for example, converting image data with a RGB color space into image data with a color space made up of hue, chroma and brightness (chromaticity and brightness), such as L*a*b*, to match colors of an object image to colors of a target image in terms of hue and chroma, and subsequently converting image data with a color space made up of hue, chroma and brightness into RGB image data.

The color table generator 30 may generate a single color table for each object image; however, when there are too many object images and this results in the increase in processing time, the color table generator 30 may generate, for instance, one color table for each type of capturing device.

The color conversion processor 32 carries out color conversion described above by applying a color table generated by the color table generator 30 to an object image.

The resolution converter 34 carries out resolution conversion for matching the resolution of an object image to the resolution of a target image.

When an object image is higher in resolution than a target image, the resolution converter 34 thins out at least a part of pixels of the object image to thereby match the resolution of the object image to the resolution of the target image. In contrast, when an object image is lower in resolution than a target image, the resolution converter 34 interpolates pixels for at least a part of pixels of the object image to thereby match the resolution of the object image to the resolution of the target image.

The resolution converter 34 may carry out resolution conversion on an object image having undergone color conversion, and alternatively, the color conversion processor 32 may carry out color conversion on an object image having undergone resolution conversion.

Clients 14 are terminal devices owned by users, such as personal computers, tablet computers and smartphones. Each client 14 includes an input unit such as a keyboard, a mouse or a touch panel, a display such as a liquid crystal display or a touch panel, and a controller that controls processing for causing the input unit to acquire instructions input by a user, processing for causing the display to display various types of information, and other processing.

The server 12 and each client 14 have transmitting and receiving sections therein, which are not described in this embodiment for avoiding the complexity, for transmitting and receiving various types of data between each other via the network 16.

Figure 3:
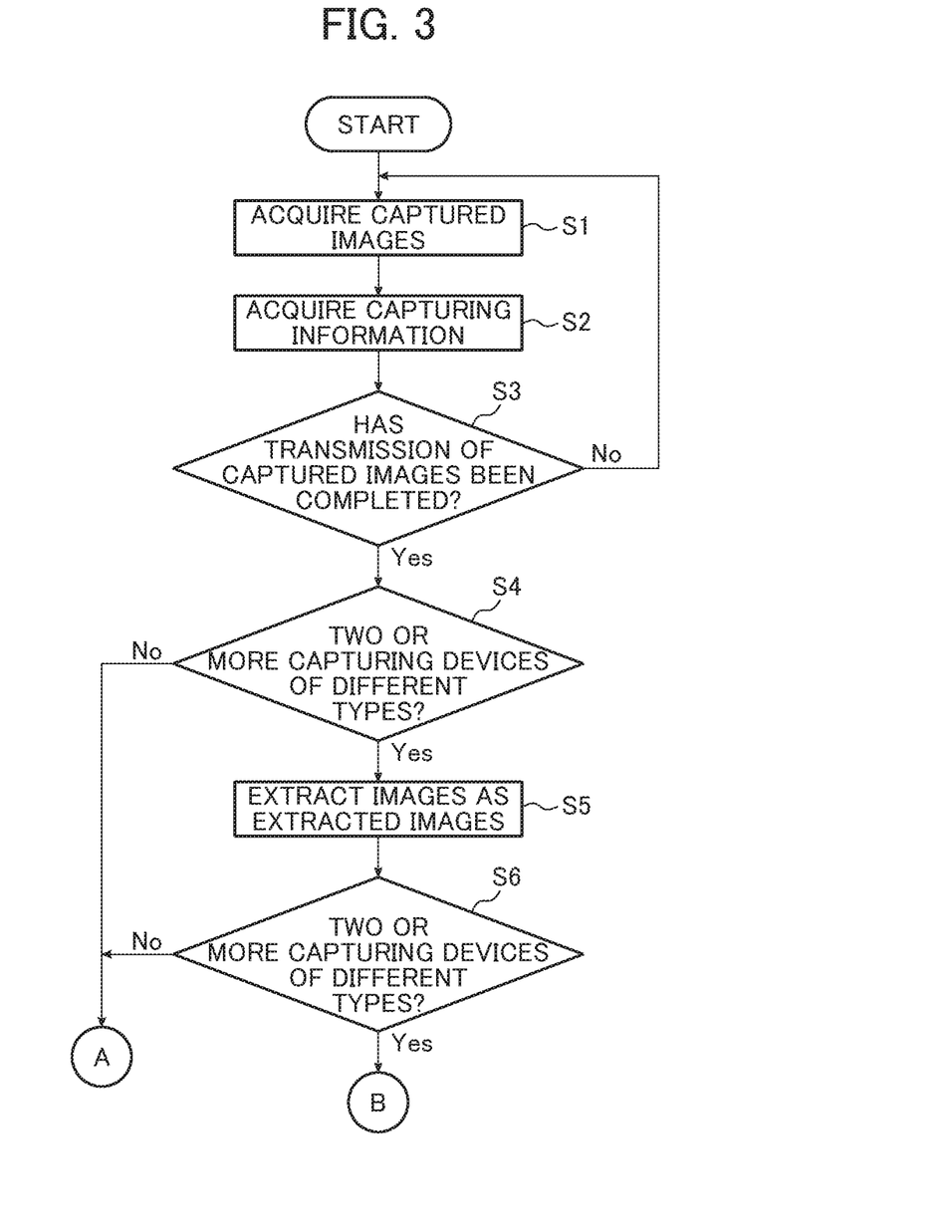
FIG. 3 is a flowchart of the operation of the image processing system shown in FIGS. 1 and 2 in an embodiment.
Figure 4:
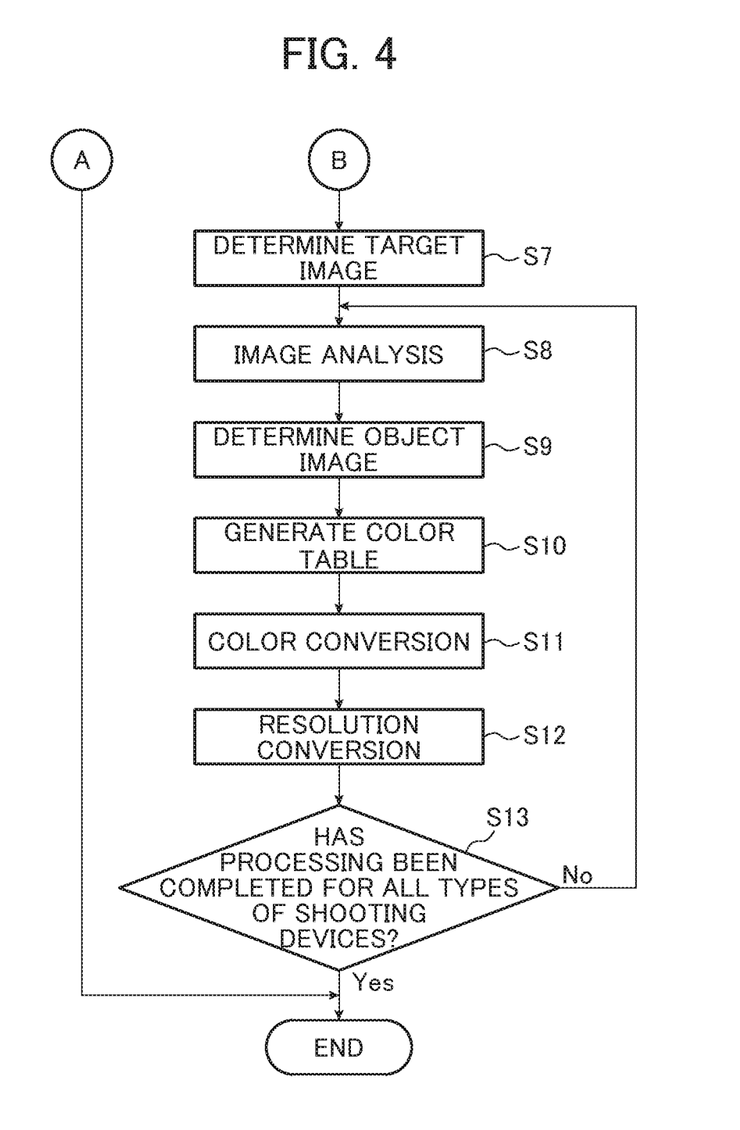
FIG. 4 is a flowchart of the operation of the image processing system following the operation in FIG. 3.

Next, the operation of the image processing system 10 is described with reference to the flowchart shown in FIGS. 3 and 4.

For instance, in response to an instruction input by the associated user, each of two or more clients 14 sends or uploads at least one captured image owned by the associated user to the server 12.

When captured images are sent from the clients 14 to the server 12, in the server 12, the image acquiring section 18 acquires the captured images sent from the clients 14 (Step S1).

Subsequently, the capturing information acquiring section 20 acquires capturing information including information on a capturing person, a type of capturing device and a capturing time (Step S2).

Subsequently, it is determined whether the transmission of captured images from the clients 14 to the server 12 has been completed (Step S3).

When the transmission of captured images has not been completed yet (No in Step S3), the flowchart returns to Step S1 and the above-described steps are repeated. Specifically, captured images are sequentially acquired, and capturing information is acquired for each captured image.

When the transmission of captured images has been completed (Yes in Step S3), it is determined whether a plurality of captured images acquired by the image acquiring section 18 are ones having been captured with two or more capturing devices of different types (Step S4).

When the plurality of captured images are ones having not been captured with two or more capturing devices of different types, that is, ones having been captured with devices of the same type (No in Step S4), the processing ends.

When the plurality of captured images are ones having been captured with two or more devices of different types (Yes in Step S4), the image extractor 22 extracts, from captured images, images regarded as being captured in the same time range based on the information on a capturing time, as extracted images (Step S5). Images regarded as being captured in the same time range are thus extracted as extracted images, and it is therefore possible to cut wasteful processing for color matching between images which do not require color matching.

Subsequently, it is determined whether the extracted images extracted by the image extractor 22 are ones having been captured with two or more capturing devices of different types (Step S6).

When the extracted images are ones having not been captured with two or more capturing devices of different types (NO in Step S6), the processing ends.

When the extracted images are ones having been captured with two or more devices of different types (Yes in Step S6), the target image determiner 24 sorts out the extracted images on a capturing person basis and a capturing device type basis based on the information on a capturing person and a type of capturing device, selects one of the extracted images which were captured by the capturing person who captured the largest number of extracted images and were captured with a capturing device of the type used to capture the largest number of extracted images based on a result of the sort-out, and determines the selected extracted image as a target image for color conversion (Step S7).

The image analysis of extracted images, the determination of an object image, the generation of a color table, the color conversion of an object image, which are described below, are carried out for each type of capturing device used to capture extracted images.

Subsequently, the image analyzer 28 carries out image analysis on each extracted image (Step S8).

Subsequently, the object image determiner 28 selects, from among extracted images other than the target image, a similar image that is an extracted image showing a subject similar to a subject present in the target image based on a result of the image analysis, and determines the selected similar image as an object image to be subjected to color conversion (Step S9). An extracted image showing such a similar subject is thus determined as an object image to be subjected to color conversion, and it is therefore possible to cut wasteful processing for color matching between images which do not require color matching.

Subsequently, the color table generator 30 generates a color table used in color conversion of the object image based on a result of the image analysis (Step S10).

Subsequently, the color conversion processor 32 carries out color conversion by applying the color table to the object image (Step S11).

Subsequently, the resolution converter 34 carries out resolution conversion on the object image (Step S12).

Subsequently, it is determined whether the color conversion and the resolution conversion have been completed for all types of capturing devices used to capture the extracted images (Step S13).

When the color conversion and the resolution conversion have been completed for all types of capturing devices (Yes in Step S13), the processing ends.

When the color conversion and the resolution conversion have not been completed for all types of capturing devices (No in Step S13), the flowchart returns to Step S8 and the above-described steps are repeated for extracted images captured with a capturing device of another type.

The image processing system 10 extracts images that are regarded as ones captured in the same time range, as extraction images, and therefore can suitably limit capturing locations and capturing environments to be subjected to color difference reduction. In addition, by determining an extracted image showing a similar subject as an object image to be subjected to color conversion, it is possible to suitably limit capturing contents to be subjected to color difference reduction. As a consequence, the color conversion for bringing about the unity in color can be rapidly carried out on a plurality of images captured with capturing devices of different types.

Thus, when, for instance, plural users bring their own images to create a composite image, such as a photo book in which a plurality of images are arranged on pages with the layout desired by the users or a shuffle print in which a plurality of images are mixed up and disorderly arranged on a single print, the image processing system 10 carries out color conversion and resolution conversion on the images so that a composite image can be created with the unity in color and resolution.

While described is the case of using the image processing system having the server 12 and two or more clients 14 connected to the server 12 via the network 16, the invention is not limited thereto. The image processing device of the invention may be configured as a function the server 12 has as in this embodiment or, alternatively, for instance, as a function each client 14 has, and in that case, the server 12 and the network 16 are omissible. Two or more clients 14 may be directly connected to each other via a network 15.

The device of the present invention may be composed of constituent elements that are dedicated hardware devices or composed of a computer in which operations of the constituent elements are programmed.

The method of the present invention can be carried out by, for instance, a program that causes a computer to implement steps of the method. A computer readable recording medium having the program recorded thereon may also be provided.

While the present invention has been described above in detail, the invention is not limited to the above embodiment, and various improvements and modifications may be made without departing from the spirit and scope of the invention.

What is claimed is:

1. An image processing device comprising:
an image acquiring section configured to acquire a plurality of captured images captured by one or more capturing persons with two or more capturing devices of different types;
a capturing information acquiring section configured to acquire, as capturing information, information on a capturing person, a type of capturing device and a capturing time for each of the captured images;
an image extractor configured to extract, from the captured images, captured images regarded as being captured in a same time range based on the information on a capturing time, as extracted images;
a target image determiner configured to sort out the extracted images on a capturing person basis and a capturing device type basis based on the information on a capturing person and a type of capturing device, select one of extracted images which were captured by a capturing person who captured largest number of extracted images and were captured with a capturing device of a type used to capture largest number of extracted images based on a result of the sorting out and determine the one of the extracted images selected, as a target image for color conversion;
an image analyzer configured to carry out image analysis on the extracted images;
an object image determiner configured to select, from among the extracted images other than the target image, one or more similar images that are extracted images each showing a subject similar to a subject present in the target image based on a result of the image analysis and determine the one or more similar images selected, as one or more object images to be subjected to the color conversion;
a color table generator configured to generate a color table used in the color conversion for matching colors of the one or more object images to colors of the target image based on the result of the image analysis; and
a color conversion processor configured to carry out the color conversion by applying the color table to the one or more object images.

2. The image processing device according to claim 1, wherein in cases where the captured images are arranged in chronological order, the image extractor extracts a group of chronologically-arranged captured images that were captured in a certain period of time set in advance, as the extracted images.

3. The image processing device according to claim 1, wherein in cases where the captured images are arranged in chronological order, the image extractor extracts a group of chronologically arranged captured images in which chronologically-adjacent captured images were captured at a time interval shorter than a threshold, as the extracted images.

4. The image processing device according to claim 1, wherein the image extractor extracts a group of captured images captured in a same event, as the extracted images, based on the result of the image analysis.

5. The image processing device according to claim 1, wherein the target image determiner selects one of the extracted images which has an evaluation value not less than a threshold based on the result of the image analysis and determines the one of the extracted images selected, as the target image.

6. The image processing device according to claim 1, wherein the object image determiner selects, from among the similar images, a similar image captured with a capturing device of a type different from the type of the capturing device used to capture the target image and determines the similar image selected, as the target image.

7. The image processing device according to claim 1, wherein the object image determiner selects, from among the similar images, a similar image having an evaluation value less than a threshold based on the result of the image analysis and determines the similar image selected, as the target image.

8. The image processing device according to claim 1, wherein the object image determiner selects, from among the similar images, a similar image captured with a capturing device of a type different from the type of the capturing device used to capture the target image and having an evaluation value less than a threshold based on the result of the image analysis, and determines the similar image selected, as the target image.

9. The image processing device according to claim 1, wherein the object image determiner uses color correction that the one or more capturing persons applied for the captured images in past, selects, from among the similar images, a similar image that needs the color correction and determines the similar image selected, as the object image.

10. The image processing device according to claim 1, wherein the color table generator generates the color table using one or more regions in the target image and the object image.

11. The image processing device according to claim 10, wherein the color table generator generates the color table using a face region of a person present in the target image and the object image based on a result of face detection processing.

12. The image processing device according to claim 10, wherein the color table generator generates the color table using a region of an object other than a person present in the target image and the object image based on a result of object recognition processing.

13. The image processing device according to claim 10, wherein the color table generator generates the color table using a region of background present in the target image and the object image based on a result of scene recognition processing.

14. The image processing device according to claim 1, wherein the color table generator uses color correction that the one or more capturing persons applied for the captured images in past and generates, as the color table, a color table for use in color conversion including the color correction.

15. The image processing device according to claim 1, wherein the color table generator generates, as the color table, a color table for use in color conversion for matching colors of the object image to colors of the target image only in terms of hue and chroma without changing lightness.

16. The image processing device according to claim 1, wherein the color table generator generates one color table for each of the object images.

17. The image processing device according to claim 1, wherein the color table generator generates one color table for each of the types of the capturing devices.

18. The image processing device according to claim 1, further comprising:
a resolution converter configured to carry out resolution conversion for matching resolution of the object image to resolution of the target image.

19. An image processing method comprising:
a step of acquiring a plurality of captured images captured by one or more capturing persons with two or more capturing devices of different types, with an image acquiring section;
a step of acquiring, as capturing information, information on a capturing person, a type of capturing device and a capturing time for each of the captured images, with a capturing information acquiring section;
a step of extracting, from the captured images, captured images regarded as being captured in a same time range based on the information on a capturing time, as extracted images, with an image extractor;
a step of sorting out the extracted images on a capturing person basis and a capturing device type basis based on the information on a capturing person and a type of capturing device, selecting one of extracted images which were captured by a capturing person who captured largest number of extracted images and were captured with a capturing device of a type used to capture largest number of extracted images based on a result of the sorting out and determining the one of the extracted images selected, as a target image for color conversion, with a target image determiner;
a step of carrying out image analysis on the extracted images, with an image analyzer;
a step of selecting, from among the extracted images other than the target image, one or more similar images that are extracted images each showing a subject similar to a subject present in the target image based on a result of the image analysis and determining the one or more similar images selected, as one or more object images to be subjected to the color conversion, with an object image determiner;
a step of generating a color table used in the color conversion for matching colors of the one or more object images to colors of the target image based on the result of the image analysis, with a color table generator; and
a step of carrying out the color conversion by applying the color table to the one or more object images, with a color conversion processor.

20. A non-transitory computer readable recording medium having recorded thereon a program for causing a computer to execute each step of the image processing method according to claim 19.

* * * * *